(12) United States Patent
Takahashi

(10) Patent No.: US 10,323,785 B1
(45) Date of Patent: Jun. 18, 2019

(54) TABLET HOLDER

(71) Applicant: Yoshio Takahashi, Captain Cook, HI (US)

(72) Inventor: Yoshio Takahashi, Captain Cook, HI (US)

( * ) Notice: Subject to any disclaimer, the term of this patent is extended or adjusted under 35 U.S.C. 154(b) by 0 days.

(21) Appl. No.: 15/600,661

(22) Filed: May 19, 2017

(51) Int. Cl.
| | |
|---|---|
| *F16M 11/04* | (2006.01) |
| *F16M 13/00* | (2006.01) |
| *F16M 11/08* | (2006.01) |
| *F16M 11/12* | (2006.01) |
| *F16M 11/26* | (2006.01) |
| *F21V 33/00* | (2006.01) |
| *A47B 23/04* | (2006.01) |
| *B60R 11/02* | (2006.01) |
| *F16M 11/10* | (2006.01) |
| *F16M 11/16* | (2006.01) |
| *B60R 11/00* | (2006.01) |
| *F16M 11/32* | (2006.01) |
| *F16M 11/36* | (2006.01) |
| *G06F 1/16* | (2006.01) |

(52) U.S. Cl.
CPC ........... *F16M 11/04* (2013.01); *F16M 11/041* (2013.01); *F16M 11/08* (2013.01); *F16M 11/12* (2013.01); *F16M 11/26* (2013.01); *F16M 13/00* (2013.01); *F21V 33/0052* (2013.01); *A47B 23/042* (2013.01); *A47B 23/043* (2013.01); *A47B 2023/049* (2013.01); *B60R 11/02* (2013.01); *B60R 11/0241* (2013.01); *B60R 11/0252* (2013.01); *B60R 2011/0071* (2013.01); *F16M 11/10* (2013.01); *F16M 11/16* (2013.01); *F16M 11/32* (2013.01); *F16M 11/36* (2013.01); *G06F 1/1632* (2013.01)

(58) Field of Classification Search
CPC .. F16M 13/00; F16M 11/2014; F16M 11/041; F16M 11/16; F16M 11/32; A47B 23/042; A47B 23/043; A47B 2023/049; B60R 11/0252; B60R 11/02; B60R 11/0241; B60R 2011/0071
USPC ............... 248/177.1, 178.1, 441.1, 451, 918, 248/346.07, 460, 461, 122.1, 176.1, 452
See application file for complete search history.

(56) References Cited

U.S. PATENT DOCUMENTS

| | | | | |
|---|---|---|---|---|
| 1,759,165 A | * | 5/1930 | Mayer | G03D 13/12 248/177.1 |
| 2,528,990 A | * | 11/1950 | Atwood | B41J 29/15 248/451 |
| 2,595,682 A | * | 5/1952 | Lipa | A47B 23/044 248/453 |
| 2,670,228 A | * | 2/1954 | Pagliuso | F16M 11/14 248/177.1 |
| 2,881,009 A | * | 4/1959 | Delaney | G04F 7/10 108/43 |

(Continued)

*Primary Examiner* — Jonathan Liu
*Assistant Examiner* — Taylor L Morris
(74) *Attorney, Agent, or Firm* — Michael D. Eisenberg

(57) ABSTRACT

A holder for a tablet, comprising a plate having a flat, planar front side for placing a tablet thereon, and a backside. The plate is generally rectangular in shape and having four corners with rotatable retention members disposed at three of the four corners. Each of the retention members are seated in a notch of the plate and all the retention members are rotatable to a position to form a continuous, flat surface along the plate and are rotatable to positions to retain a tablet on the holder.

9 Claims, 5 Drawing Sheets

(56) References Cited

U.S. PATENT DOCUMENTS

| | | | | |
|---|---|---|---|---|
| 3,228,360 A * | 1/1966 | Jones | F16M 11/04 | 108/158 |
| 3,447,770 A * | 6/1969 | Gallamos | A47B 23/043 | 248/453 |
| 4,323,214 A * | 4/1982 | DeLuca | A47B 23/043 | 248/452 |
| 4,501,438 A * | 2/1985 | McKee | B42F 9/001 | 211/45 |
| 4,546,942 A * | 10/1985 | Winchel | F16M 11/10 | 248/187.1 |
| 4,830,328 A * | 5/1989 | Takach, Jr. | G06F 1/1616 | 248/676 |
| 4,915,033 A * | 4/1990 | Bond | B65D 19/44 | 108/55.1 |
| 4,948,082 A * | 8/1990 | Pagano | A47B 23/044 | 248/447.2 |
| 5,210,656 A * | 5/1993 | Williamson | G03B 15/06 | 248/474 |
| 5,326,058 A * | 7/1994 | Beaver | F16M 11/041 | 248/177.1 |
| 5,433,415 A * | 7/1995 | Samson | A47B 23/043 | 248/448 |
| 5,607,135 A * | 3/1997 | Yamada | A47B 23/043 | 248/447 |
| 5,639,053 A * | 6/1997 | Dmitriev | A47B 23/043 | 248/453 |
| 5,649,683 A * | 7/1997 | Ahn | A47B 23/042 | 248/453 |
| 5,667,182 A * | 9/1997 | Kribs | A47B 23/042 | 248/447 |
| 5,797,578 A * | 8/1998 | Graffeo | A47B 23/043 | 248/453 |
| 5,868,099 A * | 2/1999 | Begin | B42D 9/00 | 116/234 |
| 6,068,299 A * | 5/2000 | Peltzer | B42D 17/00 | 281/28 |
| 6,237,887 B1 * | 5/2001 | Banner | A47B 23/004 | 248/459 |
| 6,282,084 B1 * | 8/2001 | Goerdt | F16M 11/16 | 108/115 |
| 6,491,268 B1 * | 12/2002 | Channer | A47B 21/0314 | 108/55.5 |
| 6,585,212 B2 * | 7/2003 | Carnevali | B60R 11/02 | 248/316.4 |
| 6,700,488 B1 * | 3/2004 | Leyden | G08B 13/1463 | 340/568.1 |
| 6,748,873 B2 * | 6/2004 | Brown, Sr. | A47B 3/10 | 108/49 |
| 7,032,872 B2 * | 4/2006 | Sullivan | F16M 13/00 | 248/346.06 |
| 7,187,283 B2 * | 3/2007 | Leyden | G08B 13/1463 | 340/568.1 |
| 7,611,112 B2 * | 11/2009 | Lin | B60R 11/02 | 248/274.1 |
| 7,744,048 B1 * | 6/2010 | McKellery | F16M 11/041 | 248/176.1 |
| 7,810,645 B2 * | 10/2010 | Huang | H01L 21/67775 | 206/710 |
| 7,866,623 B2 * | 1/2011 | Lampman | A47F 7/024 | 248/186.2 |
| 8,201,788 B2 * | 6/2012 | Carnevali | F16B 5/0635 | 248/223.41 |
| 8,235,334 B1 * | 8/2012 | Kobal | F16M 11/041 | 248/122.1 |
| 8,534,619 B2 * | 9/2013 | Huang | F16M 11/10 | 248/163.1 |
| 8,814,128 B2 * | 8/2014 | Trinh | A47F 7/024 | 248/187.1 |
| 9,568,141 B1 * | 2/2017 | Zaloom | F16M 11/12 | |
| 2005/0178935 A1 * | 8/2005 | Brandes | F16M 11/14 | 248/177.1 |
| 2007/0120034 A1 * | 5/2007 | Sparling | A47B 23/00 | 248/458 |
| 2007/0131825 A1 * | 6/2007 | Skrodzki | F16M 11/10 | 248/177.1 |
| 2008/0093523 A1 * | 4/2008 | Dumas | A47B 19/04 | 248/447 |
| 2009/0121104 A1 * | 5/2009 | Chen | F16M 11/041 | 248/230.9 |
| 2009/0140119 A1 * | 6/2009 | To | A47B 23/044 | 248/455 |
| 2009/0316118 A1 * | 12/2009 | Dittmer | F16M 11/041 | 353/119 |
| 2010/0043503 A1 * | 2/2010 | Yao | F16M 11/16 | 70/58 |
| 2010/0195278 A1 * | 8/2010 | Wilkenfeld | F16M 13/00 | 361/679.33 |
| 2011/0073740 A1 * | 3/2011 | Leduc | A47B 23/043 | 248/451 |
| 2012/0074272 A1 * | 3/2012 | Hull | F16M 11/041 | 248/122.1 |
| 2012/0104185 A1 * | 5/2012 | Carroll | F16M 11/041 | 248/27.1 |
| 2012/0193496 A1 * | 8/2012 | Li | F16M 11/041 | 248/316.1 |
| 2012/0276962 A1 * | 11/2012 | Brzana | H04M 1/04 | 455/575.1 |
| 2013/0048824 A1 * | 2/2013 | Fan | F16M 11/041 | 248/371 |
| 2013/0175413 A1 * | 7/2013 | Waugh | F16M 11/041 | 248/124.1 |
| 2013/0293719 A1 * | 11/2013 | Ashe | H04N 7/185 | 348/157 |
| 2014/0001324 A1 * | 1/2014 | Bowles | G06F 1/1613 | 248/229.1 |
| 2014/0048662 A1 * | 2/2014 | Ferris | F16M 13/02 | 248/205.1 |
| 2014/0191523 A1 * | 7/2014 | Hansen | F16M 11/041 | 294/165 |
| 2016/0128480 A1 * | 5/2016 | Stevens | A47B 97/08 | 248/451 |
| 2017/0318958 A1 * | 11/2017 | Asante | A47B 19/06 | |

* cited by examiner

US 10,323,785 B1

TABLET HOLDER

FIELD OF THE INVENTION

The present invention relates to a holder for a tablet.

BACKGROUND OF THE INVENTION

Tablet holders are becoming increasingly popular with the rise of new technology. However, many of the tablet holders on the market fail to securely hold tablets and users risk damaging or breaking their tablets. The present invention solves this problem by featuring rotatable retention members having a hook that extends from the retention members to prevent a tablet from sliding off the retention members. The tablet is able to comfortably sit in the holder without falling out. The retention members are also rotatable into the plate, forming a flat, continuous surface with no bumps. This is useful for storing the holder for travel or in a user's bag without the retention members sticking out while not in use.

BRIEF SUMMARY OF THE EMBODIMENTS OF THE INVENTION

In a variant, a holder for a tablet comprises a plate having a flat, planar front side on which the tablet rests, and a back side. The plate also has a first pair of edges, opposite and parallel to each other, and a second pair of edges, also opposite and parallel to each other. An edge of the first pair of edges has a notched end that intersects with one of the second pair of edges. One of the second pair of edges has a pair of notched ends that each intersect with one of the first pair of edges. One of the pair of notched ends of one of the second pair of edges is opposite the notched end of one of the first pair of edges.

In another variant, the first pair of edges is perpendicular to the second pair of edges.

In another variant, the notched end of one of the first pair of edges has a clip, and each of the notched ends of one of the second pair of edges has a clip.

In a further variant, at least one slot for a bolt is centrally-placed in the back side of the plate, for attachment to a top end of a tripod.

In still another variant, a nut fits around the bolt in the slot.

In another variant, the holder swivels around a bolt while attached to a tripod, to provide a plurality of positions in which the tablet can be held.

In a variant, the plate is generally rectangular in shape and has four corners with rotatable retention members disposed at three of the four corners. Each of the retention members are seated in a notch of the plate and all the retention members are rotatable to a position to form a continuous, flat surface along the plate and are rotatable to positions to retain a tablet on the holder.

In another variant, each of the retention members has a hook that extends from the retention members to prevent a tablet from sliding off the retention members.

In a further variant, the notches are shaped to complement the shape of the retention members and hooks so that when the retention members are rotated into the plate, they form a flat, continuous surface with no bumps.

DETAILED DESCRIPTION OF THE EMBODIMENT OF THE INVENTION

Figures 1, 2:
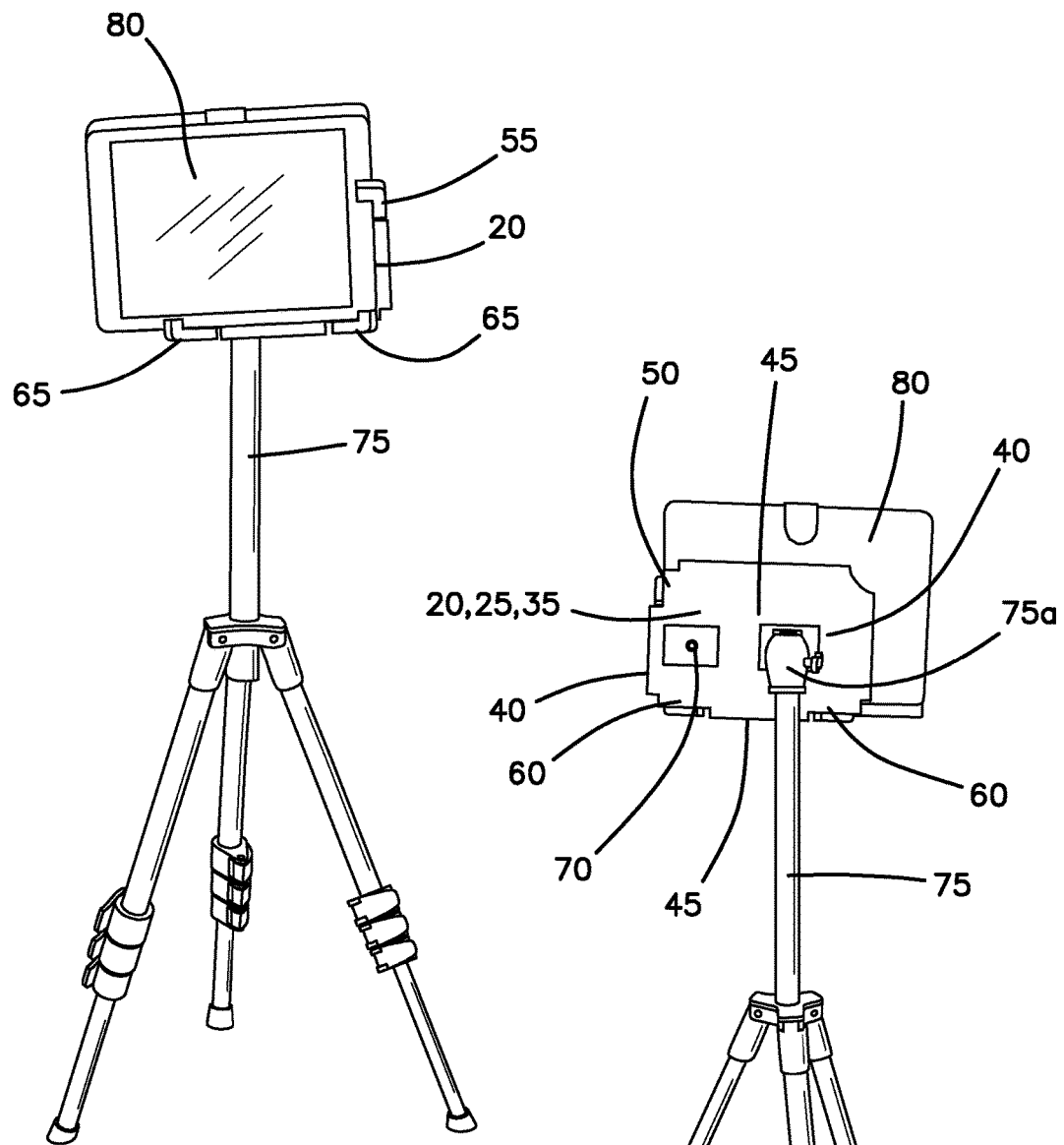
FIG. 1 depicts an aspect of a holder for a tablet.
FIG. 2 depicts a backside aspect of a holder for a tablet.
Figure 3:
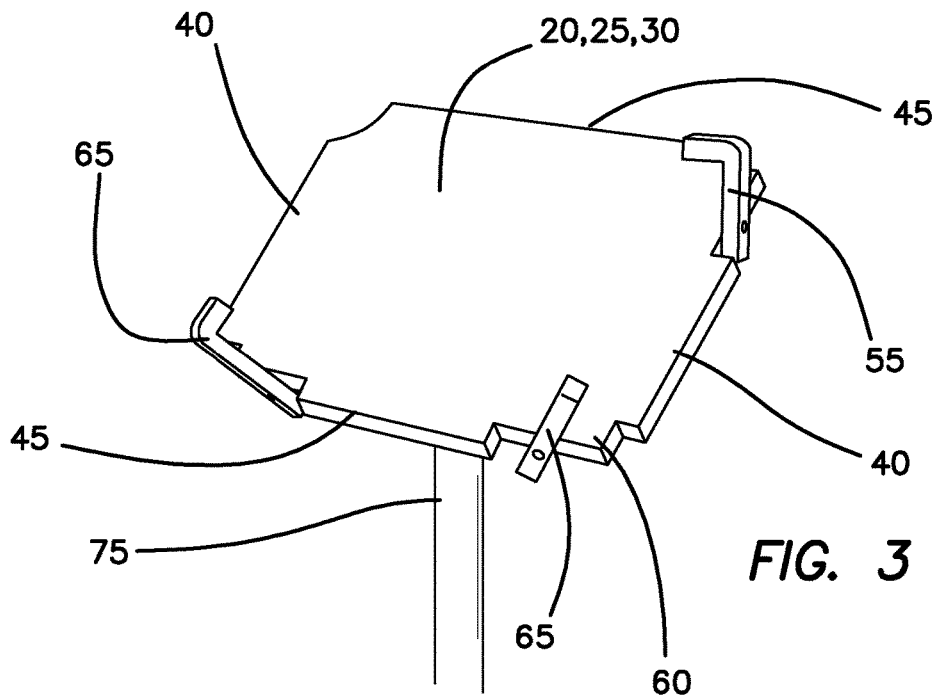
FIG. 3 depicts a front side aspect of a holder for a tablet.
Figure 4:
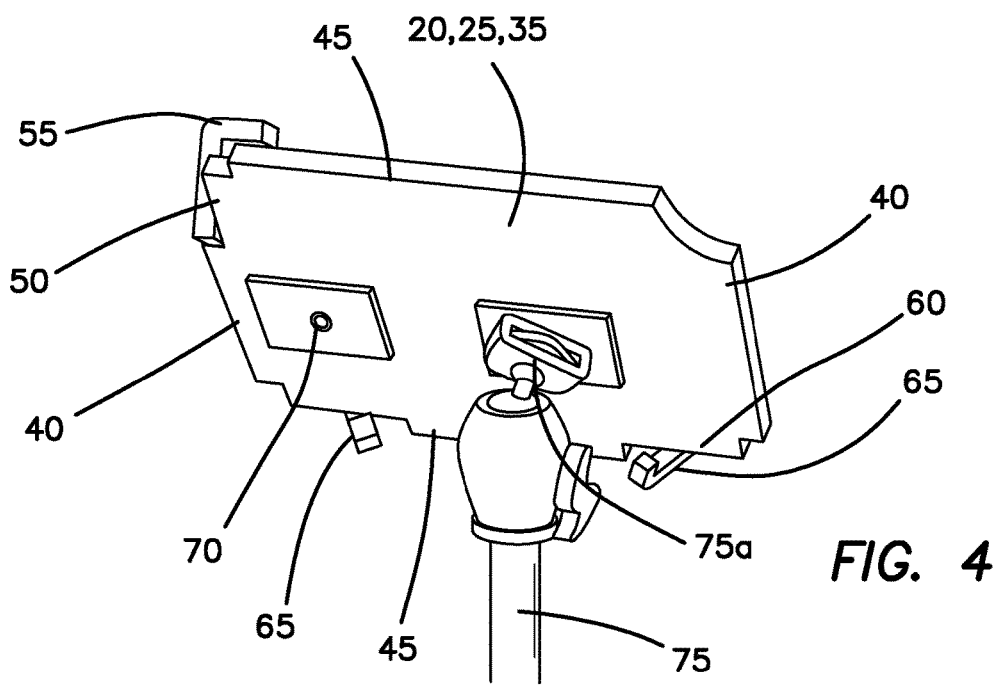
FIG. 4 depicts a backside aspect of a holder for a tablet.
Figure 5:
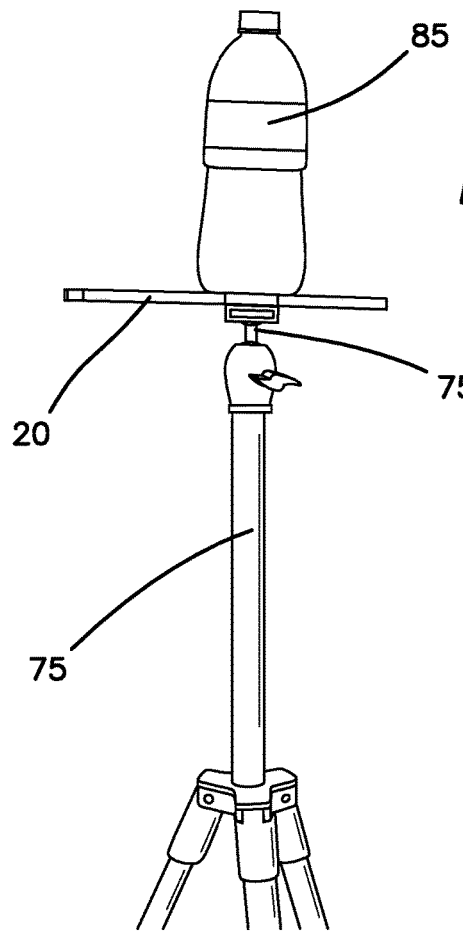
FIG. 5 depicts another aspect of a holder for a tablet.
Figure 6:
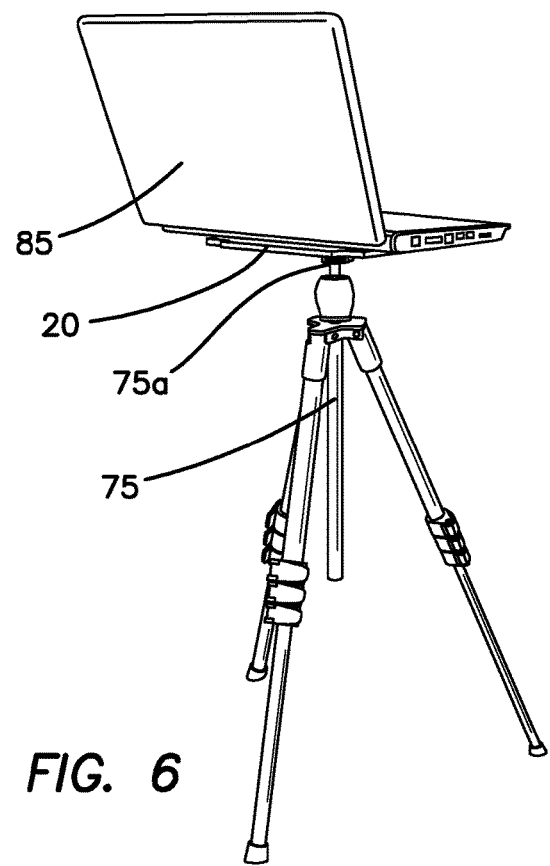
FIG. 6 depicts a variant of FIG. 5.
Figure 7:
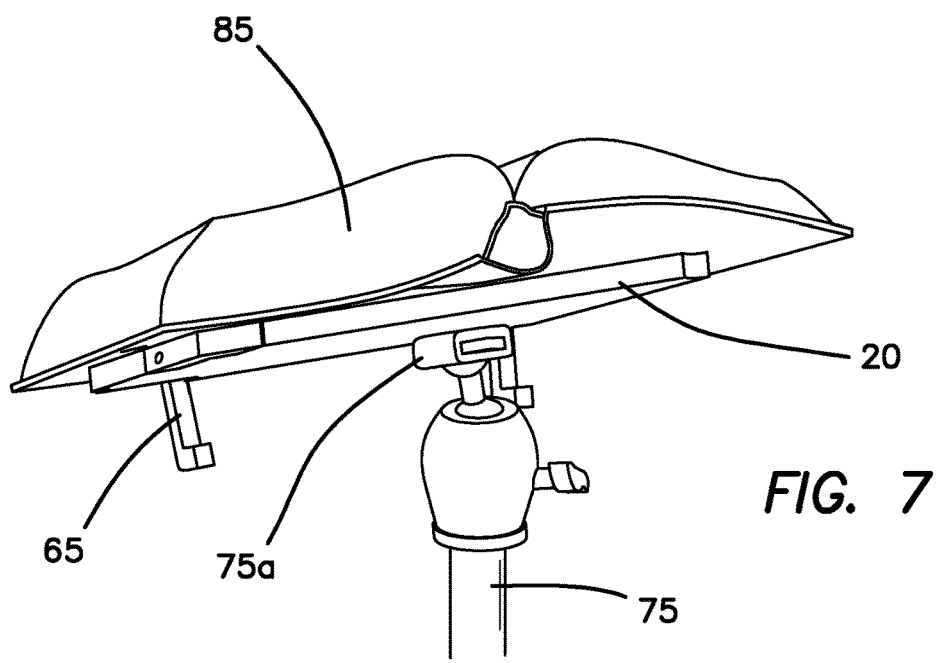
FIG. 7 depicts another variant of FIG. 5.
Figure 8:
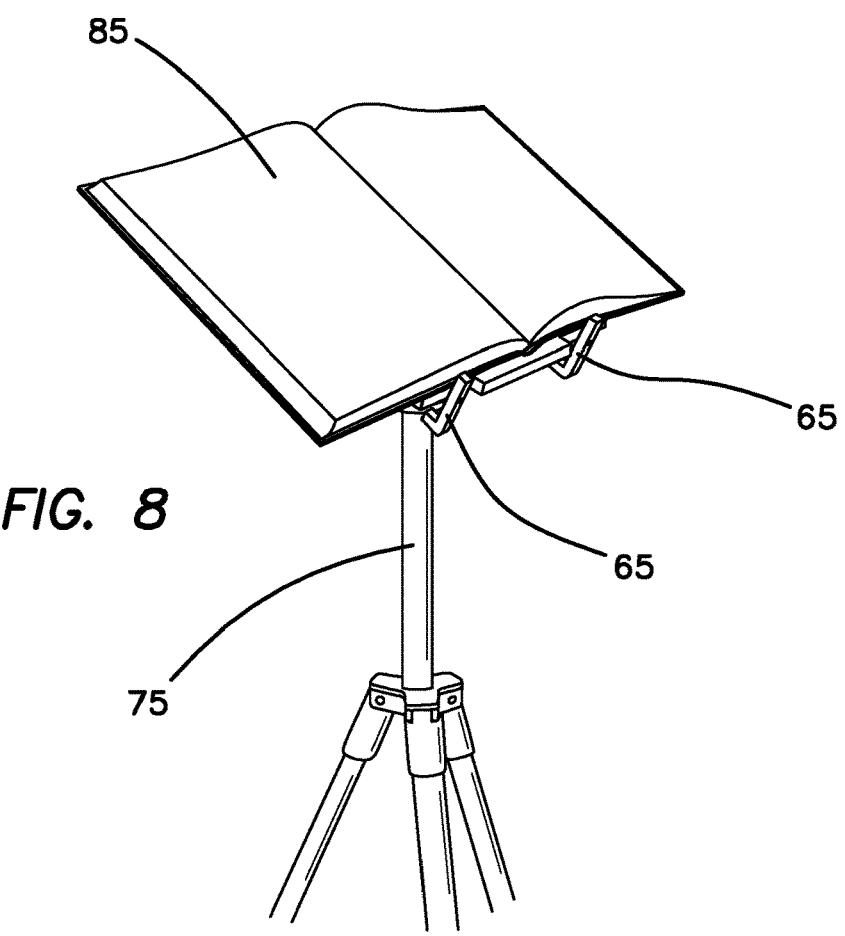
FIG. 8 depicts a further variant of FIG. 5.
Figure 9:
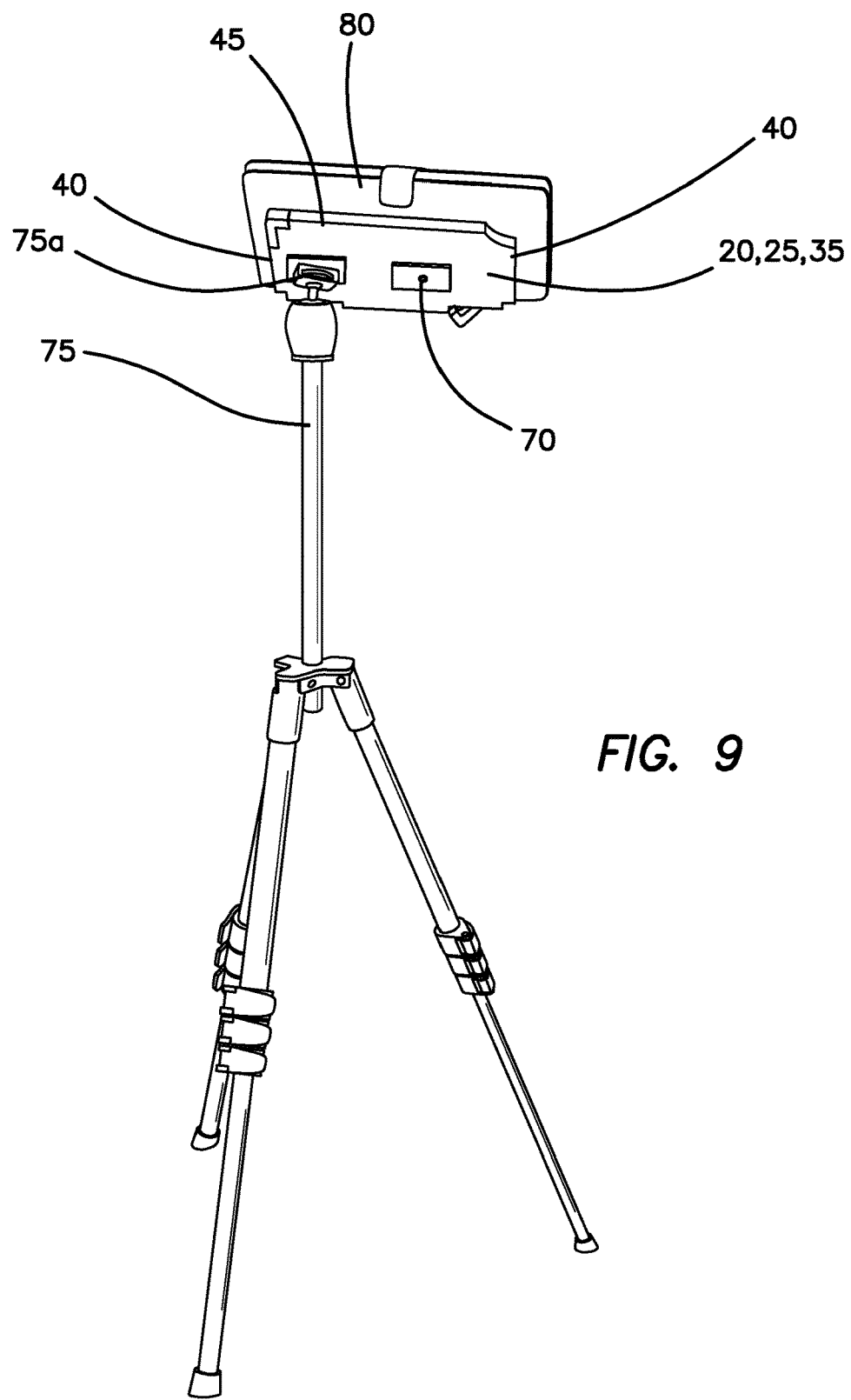
FIG. 9 depicts yet another variant of FIG. 5.

Throughout this document, the following reference numbers are used:
20 Holder
25 Plate
30 Front side
35 Back side
40 First pair of edges
45 Second pair of edges
50 Notched end
55 Clip on first pair of edges
60 Pair of notched ends
65 Clip on second pair of edges
70 Slot
75 Tripod
75a Top end of tripod
80 Tablet
85 Non-tablet object
90 Hook
95 Lower portion
100 Upper portion In a variant, generally depicted in FIGS. 1-9, a holder 20 for a tablet 80 comprises a plate 25 having a flat, planar front side 30 on which the tablet 80 rests, and a backside 35. As indicated in FIG. 2 (and additionally in FIGS. 3-4), the plate 25 also has a first pair of edges 40, opposite and parallel to each other, and a second pair of edges 45, also opposite and parallel to each other. The first pair of edges 40 is perpendicular to the second pair of edges 45. One of the first pair of edges 40 has a notched end 50, intersecting with one of the second pair of edges 45. Depicted in FIG. 4, the notched end 50 of one of the first pair of edges 40 has a clip 55, held in place by a screw. As in FIG. 3, one of the second pair of edges 45 has a pair of notched ends 60, each intersecting with one of the first pair of edges 40. One of the pair of notched ends 60 of one of the second pair edges 45 is opposite the notched end 50 of the one of the first pair of edges 40.

In a variant, the plate 25 is generally rectangular in shape and has four corners with rotatable retention members 55 disposed at three of the four corners. Each of the retention members 55 are seated in a notch 50, 60 of the plate 25 and all the retention members 55 are rotatable to a position to form a continuous, flat surface along the plate 25 and are rotatable to positions to retain a tablet 80 on the holder 20.

In another variant, each of the retention members 55 has a hook 90 that extends from the retention members 55 to prevent a tablet 80 from sliding off the retention members 55.

In a further variant, the notches 50, 60 are shaped to complement the shape of the retention members 55 and hooks 90 so that when the retention members 55 are rotated into the plate 25, they form a flat, continuous surface with no bumps and any gaps are minimized. Optionally the notches 50, 60 comprise a step. The tablet holder 20 has a lower portion 95 and comprises one of the second pair of edges 45 and has two retention members 55. These two retention members 55 are elongated in a horizontal direction along the bottom edge 95 of the tablet holder 20 (See FIG. 3). Similarly, the tablet holder 20 has an upper portion 100 and comprises a second edge of the second pair of edges 45 and, in one embodiment, has one retention member 55. This retention member 55 is elongated in a vertical direction along the side of the tablet holder 20 (See FIG. 3).

The edges are sized and shaped to accommodate standard tablet sizes commercially available. For example, the first pair of edges 40 has a length of 5.5". The second pair of edges 45 has a length of 8". Each of the pair of notched ends 60 of one of the second pair of edges 45 has a clip 65, held in place by a screw. Each of the clips 55, 65 swivel around a respective one of the screws.

In a variant, at least one slot 70 (indicated in FIG. 2, and additionally in FIGS. 4 and 9) for a bolt is centrally-placed within the back side 35 of the plate 25, for attachment to a top end 75*a* (FIG. 2, primarily) of a tripod 75 (FIG. 2, primarily). A nut may fasten the bolt in place. The nut, in a variant, may have dimensions of 0.25"-20×0.3125". The holder 20 swivels around the bolt while attached to the tripod 75, to provide a plurality of positions in which the tablet 80 can be held. The top end 75*a* of the tripod 75 is adjustable in height, so that the tablet 80, or any object 85 (such as a water bottle in FIG. 5, a laptop in FIG. 6, or a book in FIGS. 7-8) can be secured to the holder 20. Optionally, the holder 20 can be made of plastic, metal, or wood.

What is claimed is:

1. A holder for a tablet, comprising:
a plate having a flat, planar front side on which the tablet rests, and a back side; the plate also having a first pair of edges, comprising a first edge and a second edge opposite and parallel to each other, and a second pair of edges, comprising a third edge and a fourth edge opposite and parallel to each other;
the first edge of the first pair of edges having a first recessed end and a second recessed end;
the second edge of the first pair of edges having a third recessed end;
the third edge of the second pair of edges having a fourth recessed end a fifth recessed end; and
the fourth edge of the second pair of edges having a sixth recessed end; such that:
the first recessed end meets the fifth recessed end at a first corner;
the second recessed end meets the sixth recessed end at a second corner;
the third recessed end meets the fourth recessed end at a third corner;
the holder further comprising:
a first rotatable clip joined to the second recessed end of the first edge;
a second rotatable clip joined to the fourth recessed end of the third edge; and
a third rotatable clip joined to the fifth recessed end of the third edge wherein the first, second, and third clips are joined to respective recessed ends via respective screws driven into the respective recessed ends perpendicularly to the respective recessed ends, and wherein the first, second, and third clips are configured to swivel around the respective screws.

2. The holder of claim 1, wherein the first pair of edges is perpendicular to the second pair of edges.

3. The holder of claim 1, wherein at least one slot for a bolt is in the back side of the plate, for attachment to a top end of a tripod.

4. The holder of claim 3, wherein a nut fits around the bolt in the slot.

5. The holder of claim 1, wherein the holder swivels around a bolt while attached to a tripod, to provide a plurality of positions in which the tablet can be held.

6. The holder of claim 5, wherein the tripod has an adjustable height, which allows for the tablet, or another object, to be placed at a standing height or a sitting height.

7. The holder of claim 1, wherein each of the rotatable clips has a hook that extends from the clip to prevent a tablet from sliding off the clips.

8. The holder of claim 1, wherein a fourth corner of the holder that lacks a rotatable clip is recessed.

9. The holder of claim 1, made out of plastic, metal, or wood.

* * * * *